United States Patent [19]

Bauer

[11] 4,246,618

[45] Jan. 20, 1981

[54] FLOPPY DISC DRIVE UNIT

[75] Inventor: Paul Bauer, Ergolding, Fed. Rep. of Germany

[73] Assignee: Siemens Aktiengesellschaft, Berlin & Munich, Fed. Rep. of Germany

[21] Appl. No.: 19,112

[22] Filed: Mar. 9, 1979

[30] Foreign Application Priority Data

Mar. 22, 1978 [DE] Fed. Rep. of Germany ....... 2812574

[51] Int. Cl.³ .................. G11B 5/016; G11B 17/02
[52] U.S. Cl. ........................................................ 360/99
[58] Field of Search ................................. 360/97–99; 274/39 A; 346/137

[56] References Cited

U.S. PATENT DOCUMENTS

| 3,678,481 | 7/1972 | Dalziel et al. | 360/99 |
| 3,768,815 | 10/1973 | Mathurin | 274/40 |
| 3,890,643 | 6/1975 | Dalziel | 360/99 |
| 3,898,814 | 8/1975 | Chou et al. | 64/22 |
| 4,127,882 | 11/1978 | Kohl et al. | 360/98 |

*Primary Examiner*—Robert S. Tupper
*Attorney, Agent, or Firm*—Hill, Van Santen, Steadman, Chiara & Simpson

[57] ABSTRACT

The invention concerns a floppy disc drive unit in which all the movements are made automatically with the aid of two motors. Using a positioning motor positioning a magnetic head on various tracks of the floppy disc, the floppy disc is automatically drawn into the floppy disc drive unit and ejected therefrom. With the aid of a driving motor provided to drive the floppy disc, the floppy disc is clamped and unclamped and felt pressure pads are lowered and raised automatically.

5 Claims, 3 Drawing Figures

FLOPPY DISC DRIVE UNIT

BACKGROUND OF THE INVENTION

1. Field of the Invention

The invention concerns a floppy disc drive unit in which a driving motor drives a floppy disc by means of a clamping device and in which a positioning motor positions a magnetic head disposed on a head carrier on various tracks on the floppy disc.

2. Description of the Prior Art

U.S. Pat. Nos. 3,678,481; 3,768,815; 3,890,643 and 3,898,814 are typical of the prior art and are fully incorporated herein by this reference.

In the floppy disc drive unit known from U.S. Pat. No. 3,678,481 the floppy disc is inserted by hand. Before insertion, the lid of the floppy disc drive unit is raised. Then, the floppy disc is inserted and the lid is closed again. Simultaneous with the closure of the lid, a clamping device is actuated which centers the floppy disc and through which the floppy disc is driven. If with this known floppy disc drive unit, the floppy disc is inserted incorrectly, the result can be damage to the floppy disc. For example, the floppy disc is damaged if it has not been inserted fully and the clamping device is actuated or the lid closed. After the floppy disc has been inserted, a magnet arrangement is actuated which lowers felt contact pads onto the floppy disc. One felt pressure pad presses the floppy disc against a positionable magnetic head while a second felt pressure pad near the magnetic head presses down on the floppy disc. Because of the use of the magnet in this known floppy disc drive unit, the lowering and raising of the felt pressure pads is relatively expensive.

SUMMARY OF THE INVENTION

Consequently, the underlying object of the invention is to provide a floppy disc drive unit in which all movements are effected automatically and which still remains very inexpensive.

In accordance with the invention, the above object is achieved with the floppy disc drive unit of the type generally mentioned above in that all the movements in the floppy disc drive unit are effected exclusively through the use of the driving motor and the positioning motor.

A floppy disc drive unit constructed in accordance with the invention has the advantage that damage to the floppy disc during loading is avoided since the floppy disc is drawn into and ejected from the floppy disc drive unit automatically. The arrangement is inexpensive since there is no need for any other driving elements, such as motors or electromagnets for example. Moreover, the floppy disc drive unit can be made slim because the area in which the clamping device and the lid swing is no longer required. Because of the automatic loading of the floppy disc, the floppy disc drive unit is suitable for use in conjunction with a stack feeder.

The floppy disc drive unit is particularly inexpensive if the clamping and unclamping of the floppy disc and the lowering and raising of felt pressure pads on the side of the floppy disc remote from the magnetic head are effected using the driving motor, and if the loading and ejecting of the floppy disc are done using the positioning motor.

One particularly advantageous design for the floppy disc drive unit is obtained if the driving motor actuates a spreader arrangement clamping and unclamping the floppy disc and levers raising or lowering the felt pressure pads, and if the positioning motor moves a slide equipped with gripping elements for the floppy disc, which slide loads and ejects the floppy disc.

The sequence of individual movements in the floppy disc drive unit is determined in a simple manner if the clamping and unclamping of the floppy disc, the lowering and raising of the felt pressure pads take place simultaneously after the positioning motor has moved the slide loading and ejecting the floppy disc into its end position.

To prevent the floppy disc from being ejected while the floppy disc drive unit is operating, it is advantageous if the levers lock or unlock the slide in its end position.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
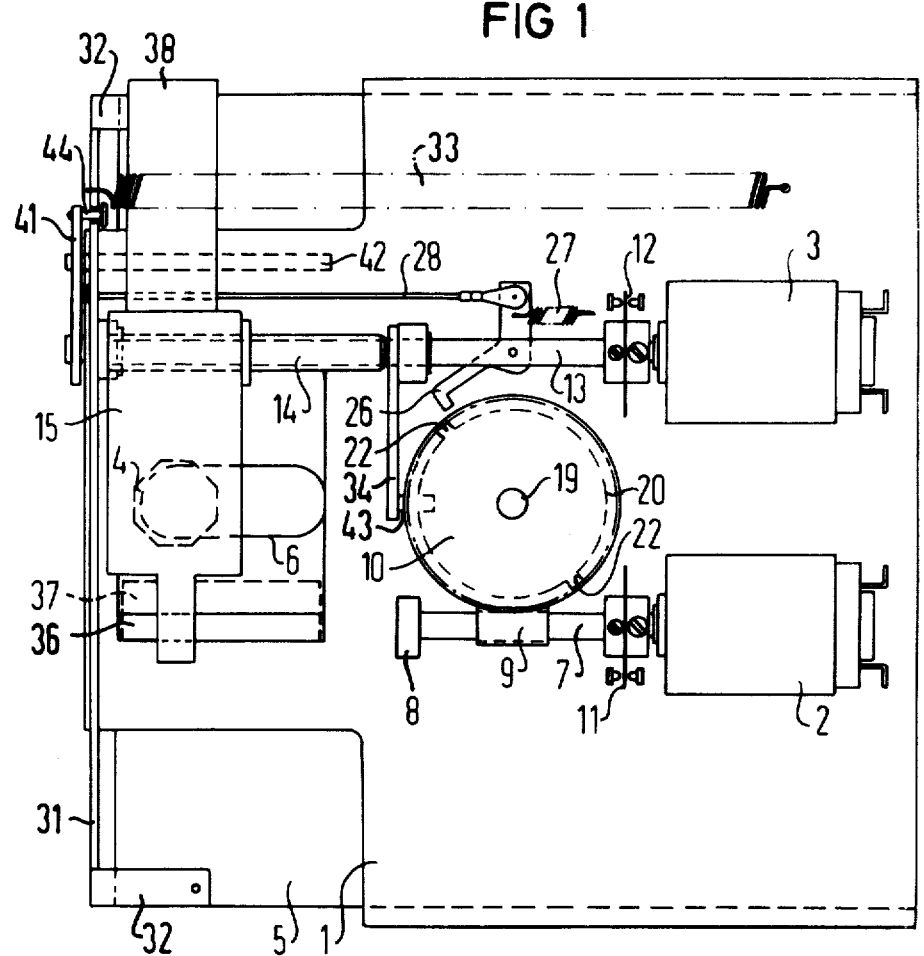
FIG. 1 is a plan view of a floppy disc drive unit constructed in accordance with the invention.

In the floppy disc drive unit shown in FIG. 1 the underside of a base plate 1 carries a DC servo motor serving as driving motor 2 for a floppy disc 5. The floppy disc 5 consists, in a manner known per se, of a flexible magnetic disc in a square casing. Both the magnetic disc and the casing exhibit central openings into which a clamping device engages, centering and driving the magnetic disc. In addition, the casing exhibits an aperture 6 through which a magnetic head 4 comes into contact with the magnetic disc. In addition to driving the magnetic disc, the driving motor 2 also serves for automatic clamping and unclamping of the magnetic disc.

Another DC servo motor, serving as positioning motor 3 for the magnetic head 4, is disposed parallel with the driving motor 2. This positioning motor 3 also serves for automatic loading and ejecting of the floppy disc 5.

A shaft 7 of driving motor 2 is disposed at right angles to a shaft 19 in the clamping device. The shaft 7 is mounted outside the driving motor 2 in a ball bearing 8. The shaft 7 carries a worm 9 which drives a wheel 10 connected to the clamping device.

To produce constant speed of rotation of the magnetic disc, the driving motor 2 is regulated. Shaft 7 carries a perforate disc 11 which allows digital control of the speed of the driving motor 2 in combination with photocells. The positioning motor 3 is designed in the same way as the driving motor 2 and is also provided with a perforate disc 12 and associated photocells.

A shaft 13 on the positioning motor 3 is partly constituted by a spindle 14 with whose aid the magnetic head 4 fixed to a head carrier 15 can be moved in the radial direction of the magnetic disc inside the aperture 6. With the aid of the positioning motor 3 the magnetic head 4 is located on various tracks on the magnetic disc.

The floppy disc 5 is drawn into the floppy disc drive unit and pushed out of it with the aid of a gripping arrangement. The gripping arrangement is constituted by a slide 31 fitted with two gripping elements 32 for the floppy disc 5. The loading and ejection can be effected with the aid of another motor or, as in the present embodiment example, with the aid of the positioning motor 3.

To load the floppy disc 5 with the aid of the positioning motor 3, the head carrier 15 on spindle 14 is moved to the middle of the floppy disc drive unit. Due to the pull of a tension spring 33, the slide 31 is pressed against the head carrier 15. The floppy disc 5 is pushed into the gripping elements 32 by hand in the area of its rear corners. The gripping elements 32 are sprung and their insides are coated with a friction lining, such as felt for example. Controlled by a signal given by a photocell or a switch, the positioning motor 3 is switched on and the head carrier 15 is moved with the aid of the positioning motor 3 along spindle 14 away from the middle. In the process it is guided by two guide rods 35 and 36. In common with the head carrier 15, the slide 31 is also moved and the floppy disc 5 grasped by the gripping elements 32 is drawn into the floppy disc drive unit.

The floppy disc 5 is drawn in beyond the working position shown in FIG. 1 by an additional amount corresponding, for example, to the width of three tracks on the magnetic disc into an end position. When the slide 31 has reached the end position, the positioning motor 3 is switched off by a stop contact. In the course of the additional movement a lever 26 is operated through a stop flange on an actuating rod 28 and preparation for automatic clamping of the magnetic disc in the clamping device is made.

Further details are described in the following in conjunction with the section view given in FIG. 2.

Figure 2:
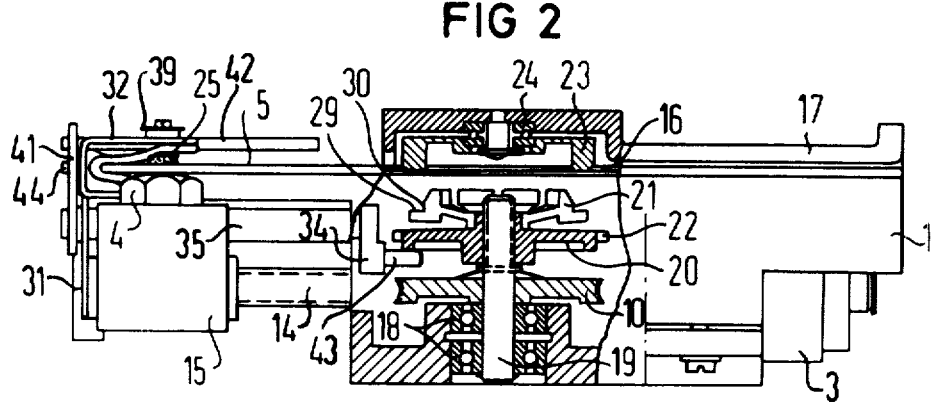
FIG. 2 is a sectional view taken through a portion of the unit of FIG. 1.

In the sectional view shown in FIG. 2 the floppy disc 5 is inserted between the base plate 1 and a top plate 17. The clamping device is formed by a pot-shaped centering sleeve 23 and a spreader arrangement. The centering sleeve 23 is mounted in a ball bearing 24 in the top plate 17. The spreader arrangement consists of a disc 20 fitted with protrusions 22 and of a spreader crown 21. The clamping device is rotatably mounted by means of the shaft 19 mounted in two ball bearings 18. The upper part of the shaft 19 is threaded and on it the spreader arrangement is disposed screwably axially.

When the slide 31 has reached its end position and the positioning motor 3 has been switched off, the driving motor 2 is switched on. The driving motor 2 drives the shaft 19 through the worm drive formed by the worm 9 and the wheel 10. After the actuating rod 28 has been operated, lever 26 engages with one of the protrusions 22 on disc 20 and prevents the spreader arrangement from turning. Since the upper part of shaft 19 is threaded, the spreader arrangement is screwed upwardly. The spreader crown 21 is screwed into the central opening in the magnetic disc 16 until this is firmly clamped axially between the edges 29 and the centering sleeve 23. The spreader crown 21 is so designed that its spokes from an acute angle with the radial plane of shaft 19. As a result the edges 30 of the spreader crown 21 are pressed outwardly as it is screwed into the centering sleeve 23 and the magnetic disc 16 is centered while it is being clamped.

While the magnetic disc 16 is being clamped, the slide 31 is locked and a felt pressure pad 25 opposite the magnetic head is lowered onto the magnetic disc 16. In addition, another felt pressure pad 37 is lowered onto the floppy disc 5. These operations are described in the following in conjunction with the sectional view given in FIG. 3.

Figure 3:
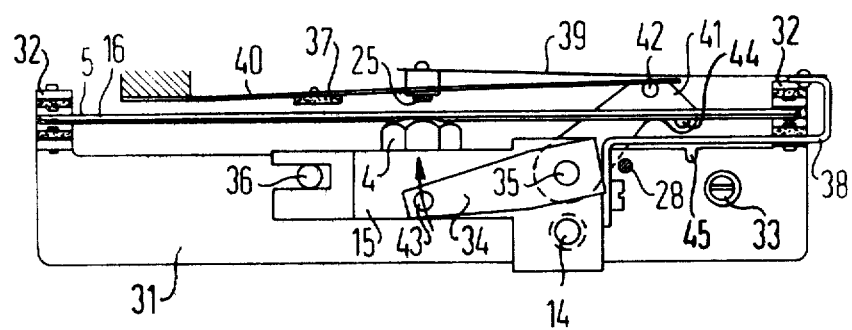
FIG. 3 is a sectional view taken through another portion of the unit of FIG. 1.

In the part of a sectional view shown in FIG. 3 through the floppy disc drive unit level with the magnetic head 4, the head carrier 15 moved by the spindle 14 is illustrated, this carrier being guided by the guide rods 35 and 36. Shown behind the head carrier 15 there is the slide 31 with the gripping elements 32 which is also guided on guide rods 35 and 36. A bracket 38 is fixed to the head carrier 15 and at the other end of the bracket, on the top side of the floppy disc 5, is fixed a leaf spring 39 fitted with a felt pressure pad 25. The other felt pressure pad 37 is fixed to a sprung bracket 40 secured to the chassis. Before the floppy disc 5 is inserted, the elements 39 and 40 carrying the felt pressure pads 25 and 37 are held in the raised position shown by a pin 42 fixed to a lever 41. The lever 41 is linked by means of the guide rod 35 to a lever 34. The lever 34 is fitted with a pin 43 which is pressed against the underside of the disc 20 through the force of the leaf spring 39. In addition, the lever 41 has a bolt 44 fixed to it which works with a slot 45 in the slide 31.

On clamping the floppy disc, when the disc 20 is moved upwardly, the levers 34 and 41 are turned clockwise around the guide rod 34. At the same time, the leaf spring 39 resting on the pin 42 and the bracket 40 are lowered so that the felt pressure pads 25 and 37 are located on the magnetic disc 16 and the floppy disc 5, respectively. In addition, the bolt 44 engages in the slot 45. The bolt 44 exhibits a head whose diameter is greater than the size of the slot 45 and the slide 31 is thereby locked in its end position.

After the clamping of the magnetic disc 16, the lowering of the felt pressure pads 25 and 37 and the simultaneous locking of slide 31, the driving motor 2 is switched off. This is done, for example, by measuring the current through the driving motor 2 and switching the driving motor 2 off when the current exceeds a preset magnitude. Then, the positioning motor 3 is switched on to move the floppy disc 5 back over the additional distance travelled to the working position in the middle. The slide 31 follows over a distance that is less than the additional distance and corresponds, for example, to the width of two tracks. The actuating rod 28 is operated no more and, under the pull of a tension spring 27, the lever 26 assumes its resting position. The spreader arrangement is no longer prevented from turning and, after the driving motor 2 has been switched on, the magnetic disc 16 is driven through the clamping device. Then, the positioning motor 3 can locate the magnetic head 4 on the desired tracks of the magnetic disc 16. Since the slide 31 has been locked using the bolt 44, the slide 31 is not moved while the magnetic head 4 is positioned and the floppy disc 5 remains in its working position.

To unclamp the magnetic disc 16, the head carrier 15 pushes the slide 31 away from the middle back into its end position again. In the process, the actuating rod 28 is operated and the lever 26 engages with one of the protrusions 22 on disc 20. The driving motor 2 reverses its direction of rotation and the spreader arrangement is screwed out of the centering sleeve and out of the central opening in the magnetic disc 16 and moved downwards in the opposite direction to that when clamping. Since the pin 43 bears on the underside of the disc 20, the levers 34 and 41 are simultaneously turned in counter-clockwise direction around the guide rod 35. Because of the pin 42, the leaf spring 39 and the bracket 40 are raised again. In addition, the bolt 44 no longer engages in the slot 45 and the slide 31 is unlocked.

When the lever 34 meets a lower stop contact, the driving motor 2 is switched off. Then, the positioning motor 3 moves the head carrier 15 to the middle through the spindle 14. Under the action of the pull of tension spring 33, this movement is also followed by slide 31. Then, the positioning motor 3 is turned off. The floppy disc 5 projects out of the floppy disc drive unit by an amount equal to the distance moved by the slide 31 and can be removed.

Although I have described my invention by reference to a particular illustrative embodiment, many changes and modifications may become apparent to those skilled in the art without departing from the spirit and scope of the invention. I therefore intend to include within the patent warranted hereon all changes and modifications as may reasonably and properly be included within the scope of my contribution to the art.

I claim:

1. A floppy disc drive unit comprising:
   a frame including means defining a receipt slot for receiving a floppy disc;
   a reversible positioning motor mounted in said frame, a movably mounted head carrier with a magnetic head supported thereon, said reversible positioning motor operatively coupled to said head carrier to position said magnetic head on various tracks on said disc;
   movably mounted grasping means for grasping a floppy disc and connecting means releasably coupling said grasping means to said positioning motor to load the floppy disc into and unload the floppy disc from the drive unit;
   a reversible drive motor mounted in said frame;
   clamping means mounted in said frame on both sides of said receipt slot, said clamping means connected to and reversibly operated by said drive motor to clamp and unclamp the floppy disc when latched and to rotate the floppy disc for transducing when unlatched; and
   linkage means moved by said grasping means to first and second positions, said linkage means latching said clamping means in said first position to prevent disc rotation and effect clamping and unlatching said clamping means in said second position to permit disc rotation for transducing.

2. The floppy disc drive unit of claim 1, and further comprising:
   pressure pads mounted on the side of said receipt slot opposite said magnetic head; and
   a lever means coupled between said pads and said drive motor for moving said pads into engagement with said floppy disc as said drive motor is operated to clamp the floppy disc.

3. The floppy disc drive unit of claim 2, wherein:
   said lever means is coupled to said drive motor via said clamping means and operates simultaneously with said clamping means.

4. The floppy disc drive unit of claim 1, wherein said grasping means includes a slot and is operated by said positioning motor to a predetermined end position, and wherein
   said lever means includes a pin to be received in said slot to lock and unlock said grasping means at said predetermined end position.

5. A floppy disc drive unit comprising:
   a reversible positioning motor;
   a floppy disc loading and unloading means releasably connected to said positioning motor for grasping and loading/unloading a floppy disc;
   a magnetic head;
   a movably mounted carriage carrying said magnetic head and connected to and positioned over various tracks on the disc by said positioning motor;
   clamping means a reversible drive motor to clamp and unclamp a floppy magnetic disc when latched and to rotate the floppy magnetic disc past said magnetic head when unlatched; and
   sequence control coupling means coupled between said floppy disc loading and unloading means, said carriage and said clamping means, operated in response to the positioning and clamping operations to unlatch said loading and unloading means and said clamping means in a predetermined sequence.

* * * * *